United States Patent
Uehara

(10) Patent No.: US 7,087,542 B2
(45) Date of Patent: *Aug. 8, 2006

(54) OPTICAL GLASS

(75) Inventor: Susumu Uehara, Sagamihara (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 300 days.

This patent is subject to a terminal disclaimer.

(21) Appl. No.: 10/740,088

(22) Filed: Dec. 17, 2003

(65) Prior Publication Data

US 2004/0132605 A1 Jul. 8, 2004

Related U.S. Application Data

(63) Continuation-in-part of application No. 10/160,416, filed on May 31, 2002, now Pat. No. 6,703,333.

(30) Foreign Application Priority Data

Jun. 6, 2001 (JP) ............... 2001-170458
Apr. 19, 2002 (JP) ............... 2002-117712

(51) Int. Cl.
*C03C 3/064* (2006.01)
*C03C 3/066* (2006.01)
*C03C 4/00* (2006.01)

(52) U.S. Cl. ............... 501/77; 501/79; 501/903
(58) Field of Classification Search ............... 501/37, 501/64, 77–79
See application file for complete search history.

(56) References Cited

U.S. PATENT DOCUMENTS

| 4,891,336 A | * | 1/1990 | Prassas ............ 501/13 |
| 5,104,831 A | * | 4/1992 | Behr et al. ............ 501/13 |
| 5,262,363 A | * | 11/1993 | Yoshida et al. ............ 501/17 |
| 5,424,255 A | * | 6/1995 | Kassner ............ 501/13 |
| 5,858,898 A | * | 1/1999 | Nakahara et al. ............ 501/77 |
| 5,998,037 A | * | 12/1999 | Sridharan et al. ............ 428/472 |
| 6,255,240 B1 | * | 7/2001 | Comte et al. ............ 501/78 |
| 6,333,288 B1 | * | 12/2001 | Clement et al. ............ 501/78 |
| 6,346,493 B1 | * | 2/2002 | Kniajer et al. ............ 501/17 |
| 6,703,333 B1 | * | 3/2004 | Uehara ............ 501/77 |

* cited by examiner

*Primary Examiner*—J. A. Lorengo
*Assistant Examiner*—Elizabeth A. Bolden
(74) *Attorney, Agent, or Firm*—James V. Costigan; Hedman & Costigan

(57) ABSTRACT

There is provided an optical glass suitable for mold pressing having optical constants of a refractive index ($n_d$) within a range from 1.60 to 1.69 and Abbe number ($v_d$) within a range from 35 to 45, having a glass transition point (Tg) within a range from 300° C. to 500° C., being free from devitrification when the optical glass is held at a temperature which is higher by 100° C. than the glass transition point (Tg) for 30 minutes, comprising in mass % on oxide basis:

| | |
|---|---|
| $SiO_2$ | 20–less than 40% |
| $B_2O_3$ | 5–20% |
| $Al_2O_3$ | 0–5% |
| $ZrO_2$ | more than 3%–15% |
| $Nb_2O_5$ | 10–30% |
| MgO + CaO | 0–less than 5% |
| in which MgO | 0–less than 5% |
| CaO | 0–less than 5% |
| SrO | 0–10% |
| BaO | 0–10% |
| ZnO | 0–18% |
| $Li_2O$ | more than 5%–15% |
| $Na_2O$ | 1–10% |
| $K_2O$ | 1–10% |
| $Sb_2O_3$ | 0–1%, | and being free from $La_2O_3$, $TiO_2$, $Ta_2O_5$ and PbO.

4 Claims, No Drawings

OPTICAL GLASS

This disclosure is a continuation-in-part application of application number 10/160,416, filed 31 May 2002, now U.S. Pat. No. 6,703,333 and hereby incorporated by reference.

BACKGROUND OF THE INVENTION

This invention relates to an optical glass and, more particularly, to an optical glass which has optical constants of a refractive index ($n_d$) within a range from 1.60 to 1.69 and an Abbe number ($v_d$) within a range from 35 to 45, has a low glass transition point (Tg) and is suitable for mold press forming.

In recent remarkable development of more compact and light-weight optical instruments, more aspherical lenses tend to be used for the purpose of reducing the number of lenses constituting an optical system of an optical instrument. For manufacturing an aspherical lens, the main current of the industry is to heat and thereby soften a preform obtained from a glass gob or glass block and press the softened preform with a mold having a high precision surface for transferring its mold surface to the preform. An aspherical lens obtained by this method can be processed to a product of a desired shape at a high productivity without grinding and polishing, or with minimum grinding and polishing and, therefore, a large scale production of a product at a low cost can be expected.

There are generally two methods for manufacturing the preform. One is a dropping method according to which, as described, e.g., in Japanese Patent Application Laid-open Publication No. Hei 6-122526, melted glass is dropped from a tip of a flow tube, received and molded by a mold and then is cooled to provide a glass preform. According to this method, a preform is directly obtained while the glass is hot and, therefore, a preform can be manufactured at a high productivity in a large scale production. Besides, since a glass preform thus obtained has a lens shape which is either spherical or convex in both surfaces, an amount of change in the shape during the precision mold press forming can be held at the minimum.

The other method is to obtain a preform by cutting a glass block. This method has the problem that it requires increased steps of processing from cutting of a glass block to a step of processing to a shape which is dose to a final lens shape but, since processing to a lens shape dose to a final lens shape is conducted, an amount of change in the shape can be reduced in forming various shapes of lenses besides a lens shape which is convex in both surfaces.

In producing a glass product by precision mold pressing, it is necessary to heat and press a glass preform under a high temperature for transferring a high precision mold surface to the glass product. For this reason, a mold used for this purpose is subjected to high temperature and pressure and, as a result, the surface of the mold tends to be oxidized and corroded in softening the preform by heating. This makes it difficult to maintain a high precision surface of the mold and, therefore, the number of times of replacing the mold increases and, therefore, a large scale production of the glass product at a low cost becomes difficult. When a glass transition point (Tg) of glass which constitutes a glass preform is high, there arises the problem that damage occurs to a mold and also to a mold releasing film provided on the inner surface of the mold due to the high temperature environment in mold pressing.

Glasses having various optical constants are sought as glass used for aspherical lenses. Among them, there is a strong demand for glass having optical constants of a refractive index ($n_d$) within a range from 1.60 to 1.69 and an Abbe number ($v_d$) within a range from 35 to 45. Known in the art of glasses which have such optical constants are a $SiO_2$—$B_2O_3$—($TiO_2$+$ZrO_2$)—SrO—BaO—$R'_2O$ glass composition (Japanese Patent Application Laid-open Publication No. Hei 5-17176) and a $SiO_2$—$B_2O_3$—$ZrO_2$—$Nb_2O_5$ glass composition (Japanese Patent Application Laid-open Publication No. Hei 10-130033). The glass transition points (Tg) of examples disclosed in these prior art glasses are very high ones exceeding 500° C. and these glasses are not suitable for mold pressing. On the other hand, Japanese Patent Application Laid-open Publication No. Hei 10-265238 discloses an optical glass having a relatively low Tg. This glass, however, is not suitable for mold pressing because of poor resistance to devitrification.

A glass containing PbO tends to be fused to the mold during mold pressing, and therefore, it is difficult to use the mold repeatedly and hence it is not suitable as an optical glass for mold pressing. In a glass containing $F_2$, the $F_2$ ingredient evaporates selectively from the surface of glass melt and thereby causes cloudiness on the surface of a preform when the preform is produced from the glass melt, or, when the preform is molded by mold pressing, the $F_2$ ingredient evaporates and is deposited on the surface of the mold to cause cloudiness on the surface of the mold. For these reasons, the glass containing $F_2$ is not suitable as an optical glass for mold pressing.

It is, therefore, an object of the present invention to provide an optical glass which has eliminated the above described disadvantages of the prior art optical glasses, has optical constants of a refractive index ($n_d$) within a range from 1.60 to 1.69 and an Abbe number ($v_d$) within a range from 35 to 45, has a low transition point (Tg), has excellent resistance to devitrification, and is suitable for mold pressing.

SUMMARY OF THE INVENTION

As a result of laborious studies and experiments, the inventor of the present invention has found, which has led to the present invention, that, in a $SiO_2$—$B_2O_3$—$ZrO_2$—$Nb_2O_5$—$R'_2O$ glass (R'=Li, Na, K), a glass having the above described optical constants, having a very low glass transition point within a range from 300° C. to 500° C. and having excellent resistance to devitrification can be obtained.

For achieving the above described object of the invention, there is provided an optical glass having optical constants of a refractive index ($n_d$) within a range from 1.60 to 1.69 and Abbe number ($v_d$) within a range from 35 to 45, having a glass transition point (Tg) within a range from 300° C. to 500° C., being free from devitrification when the optical glass is held at a temperature which is higher by 100° C. than the glass transition point (Tg) for 30 minutes, comprising in mass % on oxide basis:

| | |
|---|---|
| $SiO_2$ | 20–less than 40% |
| $B_2O_3$ | 5–20% |
| $Al_2O_3$ | 0–5% |
| $ZrO_2$ | more than 3%–15% |
| $Nb_2O_5$ | 10–30% |
| MgO + CaO | 0–less than 5% |
| in which MgO | 0–less than 5% |

-continued

| | |
|---|---|
| CaO | 0–less than 5% |
| SrO | 0–10% |
| BaO | 0–10% |
| ZnO | 0–18% |
| Li$_2$O | more than 5%–15% |
| Na$_2$O | 1–10% |
| K$_2$O | 1–10% |
| Sb$_2$O$_3$ | 0–1%, | and being free from La$_2$O$_3$, TiO$_2$, Ta$_2$O$_5$ and PbO.

In one aspect of the invention, the above described optical glass comprises in mass %:

| | |
|---|---|
| Na$_2$O | 1–10% |
| K$_2$O | more than 5%–10%. |

In another aspect of the invention, the optical glass is free from devitrification when the optical glass is held at a temperature which is higher by 125° C. than the glass transition point (Tg) for 30 minutes.

DETAILED DESCRIPTION OF THE INVENTION

The optical glass of the present invention having optical constants of a refractive index within a range from 1.60 to 1.69 and Abbe number ($v_d$) within a range from 35 to 45 has a relatively low glass transition point (Tg). For maintaining a press temperature at a low level and thereby preventing damage to the mold, the glass transition point (Tg) of the optical glass of the invention should preferably be within a range from 300° C. to 500° C., more preferably be within a range from 320° C. to 480° C., and most preferably be within a range from 350° C. to 470° C.

Reasons for limiting the composition range of respective ingredients of the optical glass of the invention as defined in the claims will now be described. The respective ingredients are described in mass % calculated on oxide basis.

The SiO$_2$ ingredient is a glass forming oxide and is effective for increasing viscosity of the glass and improving resistance to devitrification and chemical durability. If the amount of this ingredient is less than 20%, stability and chemical durability of the glass are deteriorated whereas if the amount of this ingredient is 40% or over, it becomes difficult to maintain Tg at a low level. Accordingly, the amount of this ingredient is limited within a range from 20% to less than 40%.

The B$_2$O$_3$ ingredient is, like the SiO$_2$ ingredient, a glass forming oxide and is effective for improving melting property and resistance to devitrification of the glass. If the amount of this ingredient is less than 5%, sufficient resistance to devitrification cannot be obtained whereas if the amount of this ingredient exceeds 20%, chemical durability is deteriorated. Accordingly, the amount of this ingredient is limited within a range of 5–20%. A more preferable range of this ingredient is more than 10% to 20%.

The Al$_2$O$_3$ ingredient is effective for improving chemical durability of the glass. If the amount of this ingredient exceeds 5%, resistance to devitrification is deteriorated. The amount of this ingredient therefore is limited within a range of 0–5%. A more preferable range of this ingredient is 0–3% and the most preferable range thereof is 0-less than 1%.

The ZrO$_2$ ingredient is effective for adjusting optical constants and improving chemical durability. If the amount of this ingredient is 3% or below, these effects cannot be obtained whereas if the amount of this ingredient exceeds 15%, resistance to devitrification is deteriorated rather than improved. The amount of this ingredient therefore is limited within a range of more than 3% to 15%.

The Nb$_2$O$_5$ ingredient is effective for increasing the refractive index and dispersion and improving chemical durability and resistance to devitrification. If the amount of this ingredient is less than 10%, these effects cannot be achieved whereas if the amount of this ingredient exceeds 30%, resistance to devitrification is deteriorated rather than improved. The amount of this ingredient therefore is limited within a range of 10–30%. For improving chemical durability, 15% or more of this ingredient should preferably be added and, for improving resistance to devitrificaiton, 25% or less of this ingredient should preferably be added.

The MgO and CaO ingredients are effective for adjusting the refractive index and dispersion and improving chemical durability. If the amount of each ingredient is 5% or more, resistance to devitrificaiton is deteriorated. Accordingly, the amount of each ingredient is limited within a range of 0-less than 5%. The total amount of the MgO and CaO ingredients is also limited within a range of 0-less than 5%.

The SrO ingredient is effective for adjusting the refractive index and dispersion. If the amount of this ingredient exceeds 10%, resistance to devitrification and chemical durability are deteriorated. The amount of this ingredient therefore is limited within a range of 0–10%.

The BaO ingredient is effective for improving resistance to devitrification and adjusting the refractive index and dispersion. If the amount of this ingredient exceeds 10%, chemical durability is deteriorated. The amount of this ingredient therefore is limited within a range of 0–10%.

The ZnO ingredient is effective for bringing about a low Tg and improving chemical durability and further stabilizing the glass. If the amount of this ingredient exceeds 18%, resistance to devitrification is deteriorated rather than improved. The amount of this ingredient therefore is limited within a range of 0–18%. For improving chemical durability, the amount of this ingredient should more preferably be 1% or over and, for improving resistance to devitrification, the amount of this ingredient should more preferably be 18% or below.

The Li$_2$O ingredient is very effective for lowering Tg and also is effective for accelerating melting of ingredients such as SiO$_2$ in melting mixed materials. If the amount of this ingredient is less than 1%, these effects cannot be achieved whereas if the amount of this ingredient exceeds 15%, resistance to devitrification is sharply deteriorated. The amount of this ingredient therefore is limited within a range of 1–15%. The amount of this ingredient should more preferably be within a range from more than 5% to 15%.

The Na$_2$O ingredient is effective for lowering Tg and accelerating melting of the glass. If the amount of this ingredient is less than 1%, these effects cannot be achieved whereas if the amount of this ingredient exceeds 10%, chemical durability is deteriorated. The amount of this ingredient therefore is limited within a range of 1–10%.

The K$_2$O ingredient is effective for lowering Tg and accelerating melting of the glass. If the amount of this ingredient is less than 1%, these effects cannot be achieved whereas if the amount of this ingredient exceeds 10%, chemical durability is deteriorated. The amount of this ingredient therefore is limited within a range of 1–10%. The amount of this ingredient should more preferably be within a range from more than 5% to 10%.

The $Li_2O$, $Na_2O$ and $K_2O$ ingredients are essential for maintaining a low Tg level. Besides, by causing these three types of alkali ingredients to coexist together, excellent chemical durability can be obtained by a mixed alkali effect. If the total amount of these ingredients is less than 3%, such effect cannot be achieved whereas if the total amount exceeds 35%, chemical durability is sharply deteriorated. The total amount of these three ingredients therefore is limited within a range of 3–35%. The total amount of these three ingredients should more preferably be within a range from more than 11% to 35%.

The $Sb_2O_3$ ingredient may be added for defoaming the glass in melting it. It will suffice to add this ingredient in an amount up to 1%.

For adjusting optical constants and improving resistance to devitrification and chemical durability in the optical glass of the invention, one or more ingredients other than those described above including $SnO_2$, $Y_2O_3$, $Gd_2O_3$, $Yb_2O_3$, $In_2O_3$, $Ga_2O_3$, $WO_3$ and/or $GeO_2$ may be a suitable amount which will not prevent achievement of the object of the invention.

In the optical glass for mold press forming of the invention, $La_2O_3$ should preferably not be included, since this ingredient deteriorates resistance to devitrification and, moreover, increases specific gravity with resulting difficulty in realizing a light and compact design in the optical system.

In the optical glass for mold press forming of the invention, $TiO_2$ should preferably not be included for preventing deterioration in transmittance in the short wavelength region.

In the optical glass for mold press forming of the invention, $Ta_2O_5$ should preferably not be included for preventing rise in the glass transition point and for preventing increase in the cost of glass materials because $Ta_2O_5$ is a very expensive material.

The optical glass of the invention can be used for mold press forming. Mold press forming of a lens is usually performed at a temperature within a wide range from the vicinity of Tg to a temperature which is higher by 150° C. than Tg depending upon viscosity characteristic and an amount of change in the shape of the glass. For holding the pressure of the press at a low level, however, a preferable temperature for mold pressing should be within a range from Tg+100° C. to Tg+150° C. In this temperature region, devitrification tends to take place in the prior art optical glasses. Since the optical glass of the present invention is free from devitrification when the optical glass is held at a temperature which is higher by 100° C. than Tg for 30 minutes, it can be suitably formed to a desired shape by mold pressing at a temperature within a wide range from Tg+100° C. over. The optical glass of one aspect of the invention which is free from devitrification when the optical glass is held at a temperature which is higher by 125° C. than Tg for 30 minutes can be formed more suitably to a desired shape by mold pressing at a low pressure level at a temperature of Tg+125° C. or over. More preferably, the optical glass of the invention is free from devitrification when it is held at a temperature of Tg+150° C. for 30 minutes.

EXAMPLES

Examples of the present invention will now be described. It should be noted that the invention is not limited to these examples.

Tables 1 to 4 show compositions of examples (No. 1 to No. 15) of the optical glass for mold pressing and comparative examples (A to D) together with refractive index ($n_d$), Abbe number ($v_d$) and glass transition point (Tg). In the devitrification test, state of devitrification was assessed at temperatures of Tg+100° C., Tg+125° C. and Tg+150° C. which correspond to suitable mold pressing temperatures. Respective optical glass specimens having a size of 10×10×10 mm were placed on a fire resistant ceramic plain plate, temperature was elevated for two to three hours to a predetermined temperature, the specimens were held at the temperature for 30 minutes and then taken out of the furnace and the state of devitrification was observed by the eye. Specimens in which devitrification was not observed are indicated by the mark ○ and specimens in which devitrification was observed are indicated by the mark X.

The optical glasses for mold pressing of Examples No. 1 to No. 15 and the Comparative Examples A to D were easily manufactured by weighing and mixing conventional optical glass materials such as oxides, carbonates and nitrates at a predetermined ratio so that compositions described in the tables could be obtained, putting the mixed materials into a platinum crucible, melting the materials at a temperature of 1000° C. to 1400° C. for two to five hours depending upon melting characteristic of each composition, stirring and thereby homogenizing the melt, lowering the temperature to a proper temperature, casting the melt in a mold and then cooling the melt.

TABLE 1

| Glass composition | Example | | | | | |
|---|---|---|---|---|---|---|
| (mass %) | 1 | 2 | 3 | 4 | 5 | 6 |
| $SiO_2$ | 20.0 | 39.5 | 30.4 | 35.0 | 32.0 | 25.0 |
| $B_2O_3$ | 20.0 | 10.5 | 13.1 | 16.0 | 10.1 | 18.0 |
| $Al_2O_3$ | | | | | 3.0 | 0.5 |
| $ZrO_2$ | 5.0 | 5.0 | 7.7 | 3.5 | 8.0 | 5.0 |
| $Nb_2O_5$ | 25.0 | 10.0 | 21.1 | 15.0 | 20.0 | 18.0 |
| MgO | | | | | | |
| CaO | 4.5 | | | | | |
| SrO | 2.0 | | | | | 2.0 |
| BaO | 3.0 | | | | 5.0 | 3.0 |
| ZnO | | | 8.6 | 18.0 | 3.0 | 1.0 |
| $Li_2O$ | 5.3 | 15.0 | 7.6 | 5.5 | 6.0 | 10.0 |
| $Na_2O$ | 10.0 | 10.0 | 4.3 | 1.0 | 4.4 | 8.0 |
| $K_2O$ | 5.1 | 10.0 | 6.9 | 5.0 | 8.0 | 9.4 |
| $Sb_2O_3$ | 0.1 | | 0.1 | 1.0 | 0.5 | 0.1 |
| Total | 100 | 100 | 100 | 100 | 100 | 100 |
| MgO + CaO | 4.5 | | 0 | | | |
| $Li_2O$ + $Na_2O$ + $K_2O$ | 20.4 | 35.0 | 18.8 | 11.5 | 18.4 | 27.4 |
| $n_d$ | 1.683 | 1.601 | 1.666 | 1.625 | 1.646 | 1.632 |
| $v_d$ | 39.3 | 49.8 | 40.1 | 43.4 | 39.7 | 43.0 |
| Tg(° C.) | 433 | 401 | 452 | 488 | 458 | 405 |
| Devitrification test | | | | | | |
| Tg + 150° C. | ○ | ○ | ○ | X | ○ | ○ |
| Tg + 125° C. | ○ | ○ | ○ | ○ | ○ | ○ |
| Tg + 100° C. | ○ | ○ | ○ | ○ | ○ | ○ |

TABLE 2

| Glass composition | Example | | | | | |
|---|---|---|---|---|---|---|
| (mass %) | 7 | 8 | 9 | 10 | 11 | 12 |
| $SiO_2$ | 27.0 | 26.0 | 30.0 | 33.0 | 22.0 | 30.0 |
| $B_2O_3$ | 11.0 | 12.0 | 13.0 | 11.0 | 17.4 | 10.1 |
| $Al_2O_3$ | | | | | | |
| $ZrO_2$ | 15.0 | 10.0 | 9.0 | 4.0 | 4.0 | 7.0 |
| $Nb_2O_5$ | 13.0 | 23.0 | 20.0 | 30.0 | 22.0 | 21.0 |
| MgO | 4.5 | | | | | |
| CaO | | | | | 3.0 | |
| SrO | | 10.0 | | | | |

TABLE 2-continued

| Glass composition (mass %) | Example | | | | | |
|---|---|---|---|---|---|---|
| | 7 | 8 | 9 | 10 | 11 | 12 |
| BaO | 3.4 | | 10.0 | | 8.0 | 9.0 |
| ZnO | 5.0 | | | 6.0 | 16.0 | |
| Li$_2$O | 12.0 | 8.9 | 7.0 | 8.0 | 5.5 | 10.5 |
| Na$_2$O | 6.0 | 3.0 | 4.0 | 4.0 | 1.0 | 4.5 |
| K$_2$O | 3.0 | 7.0 | 7.0 | 4.0 | 1.0 | 7.8 |
| Sb$_2$O$_3$ | 0.1 | 0.1 | | | 0.1 | 0.1 |
| Total | 100 | 100 | 100 | 100 | 100 | 100 |
| MgO + CaO | 4.5 | | | | 3.0 | |
| Li$_2$O + Na$_2$O + K$_2$O | 21.0 | 18.9 | 18.0 | 17.0 | 7.5 | 22.8 |
| n$_d$ | 1.655 | 1.654 | 1.632 | 1.685 | 1.664 | 1.638 |
| ν$_d$ | 41.7 | 35.3 | 37.6 | 36.5 | 35.8 | 38.3 |
| Tg(° C.) | 405 | 425 | 447 | 474 | 455 | 410 |
| Devitrification test | | | | | | |
| Tg + 150° C. | ○ | ○ | ○ | X | ○ | ○ |
| Tg + 125° C. | ○ | ○ | ○ | ○ | ○ | ○ |
| Tg + 100° C. | ○ | ○ | ○ | ○ | ○ | ○ |

TABLE 3

| | Example | | |
|---|---|---|---|
| | 13 | 14 | 15 |
| Glass composition (mass %) | | | |
| SiO$_2$ | 30.4 | 27.9 | 25.4 |
| B$_2$O$_3$ | 10.1 | 12.6 | 7.1 |
| Al$_2$O$_3$ | 3.0 | 3.0 | |
| ZrO$_2$ | 7.7 | 7.7 | 7.7 |
| Nb$_2$O$_5$ | 21.1 | 19.1 | 21.1 |
| MgO | | | |
| CaO | | | 4.9 |
| SrO | | | |
| BaO | | | 9.9 |
| ZnO | 13.8 | 14.3 | |
| Li$_2$O | 7.5 | 7.6 | 12.6 |
| Na$_2$O | 4.3 | 4.3 | 7.3 |
| K$_2$O | 1.9 | 3.4 | 3.9 |
| Sb$_2$O$_3$ | 0.1 | 0.1 | 0.1 |
| Total | 100 | 100 | 100 |
| MgO + CaO | | | 4.9 |
| Li$_2$O + Na$_2$O + K$_2$O | 13.8 | 15.3 | 23.8 |
| n$_d$ | 1.683 | 1.673 | 1.684 |
| ν$_d$ | 39.2 | 40.2 | 40.3 |
| Tg(° C.) | 470 | 456 | 379 |
| Devitrification test | | | |
| Tg + 150° C. | ○ | ○ | X |
| Tg + 125° C. | ○ | ○ | X |
| Tg + 100° C. | ○ | ○ | ○ |

TABLE 4

| Glass composition (mass %) | Comparative Example | | | |
|---|---|---|---|---|
| | A | B | C | D |
| SiO$_2$ | 30.0 | 20.0 | 26.32 | 38.49 |
| B$_2$O$_3$ | 8.0 | 17.5 | 12.63 | 16.79 |
| Al$_2$O$_3$ | | | | |
| ZrO$_2$ | 8.0 | 5.0 | 13.69 | 9.01 |
| Nb$_2$O$_5$ | 32.0 | 31.4 | 23.05 | 13.92 |
| MgO | | 7.0 | | |
| CaO | 4.0 | 3.5 | | 1.43 |
| SrO | | 7.0 | | |
| BaO | 2.0 | | | 5.12 |
| ZnO | | 2.0 | | 3.28 |
| Li$_2$O | 5.0 | 0.5 | | |
| Na$_2$O | 7.0 | 6.0 | 24.21 | 7.78 |
| K$_2$O | 3.0 | | | 4.09 |
| Sb$_2$O$_3$ | 1.0 | 0.1 | 0.10 | 0.10 |
| Total | 100 | 100 | 100 | 100 |
| MgO + CaO | 4.0 | 10.5 | | 1.43 |
| Li$_2$O + Na$_2$O + K$_2$O | 15.0 | 6.5 | 24.21 | 15.01 |
| n$_d$ | 1.659 | 1.659 | 1.664 | 1.614 |
| ν$_d$ | 39.9 | 39.8 | 36.8 | 44.0 |
| Tg(° C.) | 482 | 497 | 518 | 532 |
| Devitrification test | | | | |
| Tg + 150° C. | X | X | X | X |
| Tg + 125° C. | X | X | X | X |
| Tg + 100° C. | X | X | X | ○ |

As shown in Tables 1 to 3, the glasses of the examples of the present invention have a refractive index (n$_d$) within a range from 1.60 to 1.69 and Abbe number (ν$_d$) within a range from 35 to 45, have a glass transition point (Tg) within a range from 300° C. to 500° C. and have sufficient resistance to devitrification and, therefore, they are suitable for mold pressing. The glass of one example of the present invention is free from devitrification when it is held at a temperature of Tg+100° C. for 30 minutes, the more preferable examples of the present invention from the standpoint of resistance to devitrification are free from devitrification when they are held at a temperature within a range from Tg+100° C. to Tg+125° C. for 30 minutes and the most preferable examples of the present invention from the standpoint of resistance to devitrification are free from devitrification when they are held at a temperature within a range from Tg+100° C. to Tg+150° C. for 30 minutes.

In contrast, the glasses of Comparative Examples A to C (Table 4) which are the prior art optical glasses have poor resistance to devitrification at a temperature within a range from Tg+100° C. to Tg+150° C. and, therefore, they cannot be used for mold pressing or can be used for mold pressing only within an extremely limited temperature range below Tg+100° C. Accordingly, they are not suitable for mold pressing. Again, the optical glasses of Comparative Examples C and D (Table 4) which are the prior art optical glasses have a glass transition point which is higher than 500° C. and, therefore, the pressing temperature must be set at a high level which tends to cause deterioration in the mold and, for this reason, these glasses are not suitable for mold pressing.

What is claimed is:

1. An optical glass having optical constants of a refractive index (n$_d$) within a range from 1.60 to 1.69 and Abbe number (υ$_d$) within a range from 35 to 45, having a glass transition point (Tg) within a range from 300° to 500°, being free from devitrification when the optical glass is held at a temperature which is higher by 100° C. than the glass transition point (Tg) for 30 minutes, comprising in mass % on oxide basis:

| | |
|---|---|
| SiO₂ | 20–less than 40% |
| B₂O₃ | 5–20% |
| Al₂O₃ | 0–5% |
| ZrO₂ | more than 3%–15% |
| Nb₂O₅ | 10–30% |
| MgO + CaO | 0–less than 5% |
| in which MgO | 0–less than 5% |
| CaO | 0–less than 5% |
| SrO | 0–10% |
| BaO | 0–10% |
| ZnO | 0–18% |
| Li₂O | more than 5%–15% |
| Na₂O | 1–10% |
| K₂O | 1–10% |
| Sb₂O₃ | 0–1%. |

2. An optical glass as defined in claim 1 comprising in mass %:

| | |
|---|---|
| Na₂O | 1–10% |
| K₂O | more than 5%–10%. |

3. An optical glass as defined in claim 1 which is free from devitrification when the optical glass is held at a temperature which is higher by 125° than the glass transition point (Tg) for 30 minutes.

4. An optical glass as defined in claim 2 which is free from devitrification when the optical glass is held at a temperature which is higher by 125° than the glass transition point (Tg) for 30 minutes.

* * * * *